UNITED STATES PATENT OFFICE.

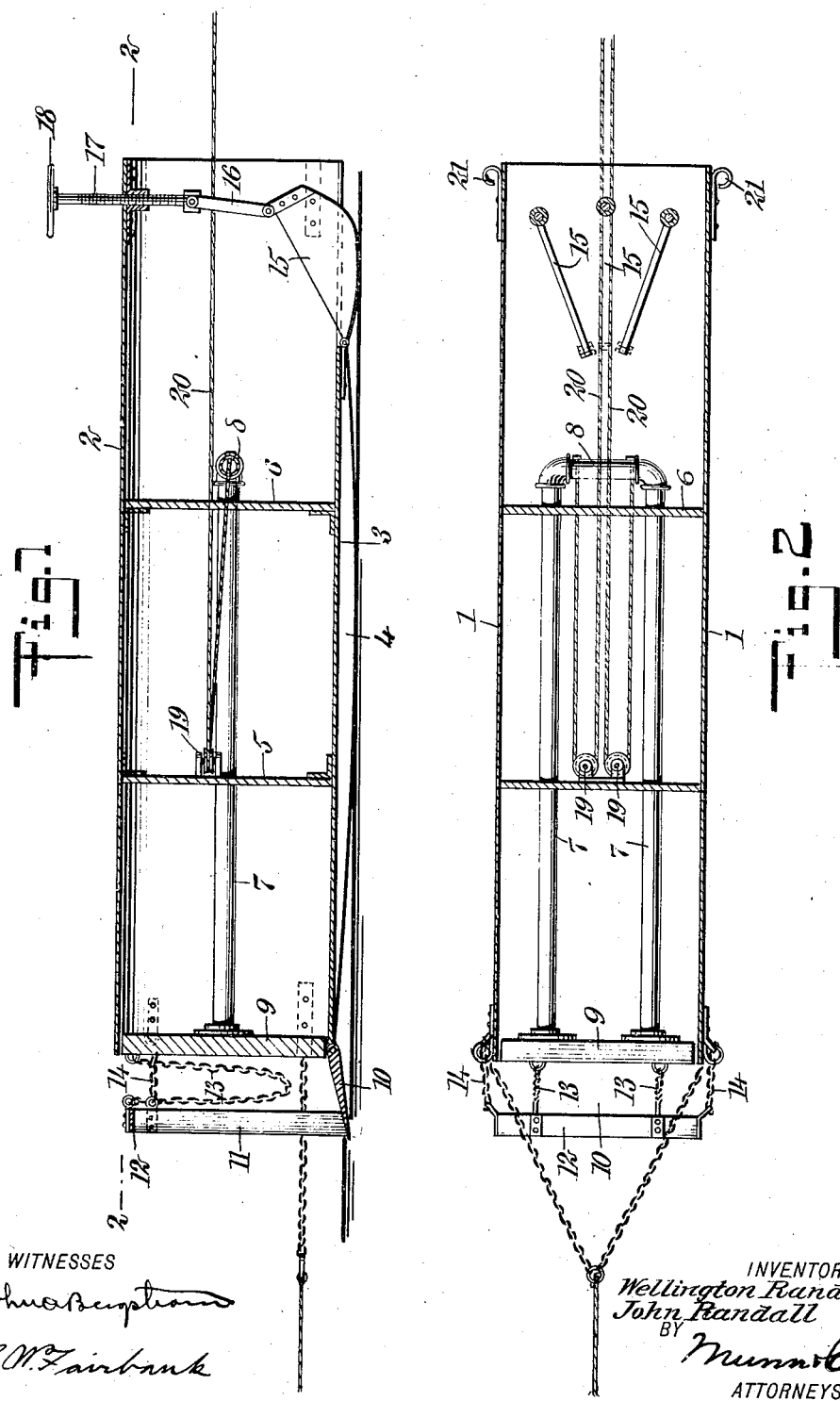

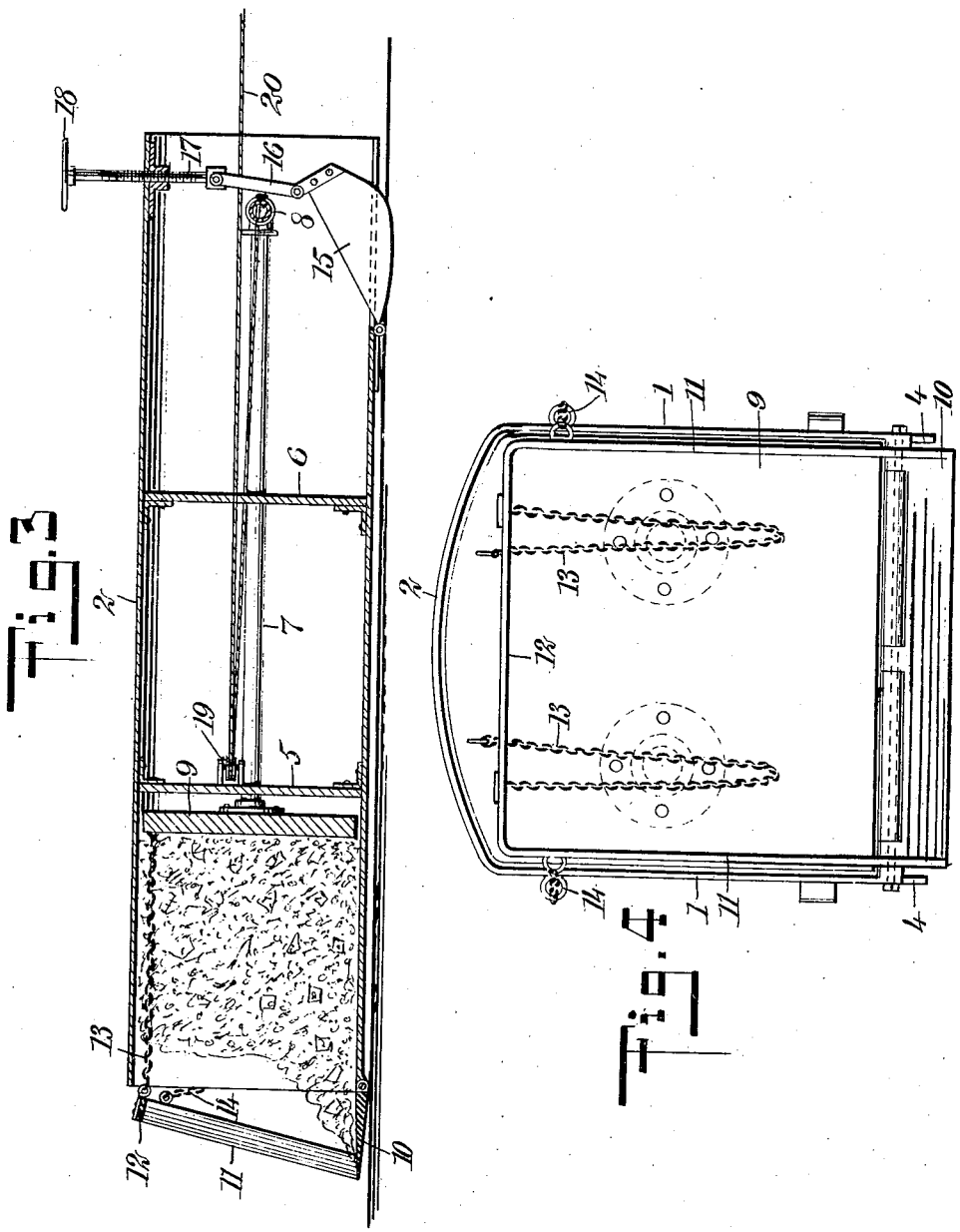

WELLINGTON RANDALL AND JOHN RANDALL, OF MARYSVILLE, WASHINGTON.

EARTH-SCRAPING MACHINE.

No. 855,336.  Specification of Letters Patent.  Patented May 28, 1907.

Application filed September 17, 1906. Serial No. 334,875.

*To all whom it may concern:*

Be it known that we, WELLINGTON RANDALL and JOHN RANDALL, both citizens of the United States, and residents of Marysville, in the county of Snohomish and State of Washington, have invented a new and Improved Earth-Scraping Machine, of which the following is a full, clear, and exact description.

This invention relates to certain improvements in earth scraping and dredging machines in which the cutting or scraping edge is automatically removed or raised from the ground when the scraper is filled, and in which the material may be automatically ejected from the scraper when it reaches the point at which it is desired to dump the material.

Our improved scraper is also provided with a novel steering means by which it may be guided in any direction desired, and involves certain other novel features of construction hereinafter set forth and pointed out in the claims.

Reference is to be had to the accompanying drawings forming a part of this specification, in which similar characters of reference indicate corresponding parts in all the views.

Figure 1 is a vertical longitudinal section; Fig. 2 is a horizontal longitudinal section and on the line 2—2 of Fig. 1; Fig. 3 is a section similar to Fig. 1, but showing the scraper filled with material; and Fig. 4 is an elevation of one end of the scraper.

The main body portion of our improved scraper comprises an open-ended box rectangular in cross section and having vertical sides 1, a top 2, and a bottom 3. The sides preferably extend a slight distance below the bottom and are slightly curved, so as to form runners 4, as shown in Fig. 1. The runners are sub-divided into compartments by two vertical partitions 5 and 6, each of which is perforated to receive the plunger arms 7. These plunger arms are preferably connected together at one end by a cross member 8, while at the other end they are rigidly secured in any suitable manner to the plunger head 9, the latter being of a size adapted to closely fit the interior of the box and capable of moving longitudinally of the same from the partition 5 to the open end.

Hinged to the bottom of the box at the front open end, is a scraping or cutting plate 10, carrying arms 11 extending upwardly from the outer edge at points adjacent the ends and having a cross bar 12 connecting the upper ends of the arms 11. This cross bar is connected to the plunger head 9 by two chains 13 of such a length that the chains will be drawn taut when the plunger head is forced against the partition 5 and the bar 12 is drawn against the open end of the box or body portion. The arms 11 are connected to the sides of the box or body portion by chains 14 of such a length that they are drawn taut when the cutting or scraping plate 10 is inclined downwardly at the desired angle.

Connected to the sides of the body portion adjacent the front end thereof, are two chains or other suitable means by which the device may be moved along the ground, while at the opposite end is located our improved steering apparatus comprising a plurality of rudders 15 pivotally secured to the bottom of the body portion and capable of being forced down through slots in said bottom. These rudders extend backward at different angles and each is provided with means for raising and lowering the same. Preferably these means comprises a link 16 secured to the upper edge of the rudder at its back end and connected to a screw-threaded rod 17, extending upwardly through the top of the body portion and having a handle 18 on its upper ends. By turning any one of the handles 18 the corresponding rudder may be forced down through the slot in the bottom of the body portion and the back end of the device will be moved in a lateral direction to an extent depending upon the inclination of the rudder and the distance which it is forced through the slot.

Secured to the back side of the partition 5 are two pulleys 19 over which pass cables 20, one end of each of the latter extending backwardly through the partition 6 and being secured to the connecting member 8 of the plunger arms, while the other end of the cable extends backwardly through the partition 6 and out the back end of the scraping machine.

In the operation of my improved scraping machine, the parts are first placed in the relationship shown in Fig. 1, and the device is drawn forward in any suitable manner. The cutting plate 10 scrapes beneath the surface of the ground and the accumulated material enters the front end of the body portion and slowly forces the plunger 9 back toward the partition 5. The depth of the cut made by the plate 10 is controlled by the length of the chains 14 and the device is guided by lowering any one of the rudders 15. When the entire front end of the machine is filled as indicated in Fig. 3, the plunger will have been forced back to the partition 5, and as the chains 13 are drawn taut, they draw back on the arms 11 and raise the cutting plate, so that it no longer engages with the ground. The device thus automatically ceases to scrape when the same is filled, and it may then be easily moved along to any required distance on the curved runners 4. When the scraper has reached its destination the source of power is detached from the front end and attached to the cables 20 and the back end of the machine. Upon drawing backward on the cables 20 the first tendency is to force the plunger 9 in the opposite direction without involving any movement whatever of the body portion. After the plunger 9 has moved to the end of the machine and all of the material has been ejected, then further pulling on the cables 20 draws the machine back to the starting point.

If desired, the cables 20 may be provided with branches connecting to the hooks 21 on the sides of the back end, said branches being of sufficient length that they will not be drawn taut until after the plunger 9 has been forced to the end of the body.

Having thus described our invention, we claim as new and desire to secure by Letters Patent:

1. A scraping machine, comprising an open-ended body portion, a scraping plate pivotally secured to the lower edge of the body portion at one end thereof, and means for automatically raising said scraping plate when the body portion becomes filled.

2. A scraping machine, comprising an open-ended body portion, a scraping plate pivotally secured to the body portion adjacent one end thereof, arms secured to the outer edge of said scraping plate, and means for automatically moving said arms backward to raise the scraping plate when the body portion becomes filled with material.

3. A scraping machine, comprising an open-ended body portion, a scraping plate pivotally secured to the lower side thereof adjacent one end, a plunger within said body portion, and means connecting said plunger and said scraping plate, whereby the latter is moved upward when the body portion becomes filled.

4. A scraping machine, comprising an open-ended body portion, a plunger located therein, and means secured to the back end for forcing said plunger toward the front end of the machine to eject the material, and for drawing the machine in the opposite direction.

5. A scraping machine, comprising an open-ended body portion, a plunger located therein, plunger arms secured to said plunger, and means connected to said plunger arms for forcing said plunger toward the front end of the machine to eject the excavated material.

6. A scraping machine, comprising an open-ended body portion, a scraping plate pivotally secured to the front end adjacent the lower side, a plunger within said body portion, means connected to said plunger for raising said scraping plate when the machine becomes filled, and means for moving said plunger forward to eject the material.

7. A scraping machine, comprising an open-ended body portion, runners located along the opposite sides, and means for steering the machine, comprising a plurality of rudders permanently set at different angles and means for raising and lowering said rudders.

8. A scraping machine, comprising an open-ended body portion rectangular in cross section, a scraping plate pivotally connected to the front end of the body portion at the lower edge thereof, means for automatically raising said scraping plate when the body portion becomes filled, means for ejecting the material as the machine is drawn backward, and means for steering the machine, said last mentioned means comprising a plurality of rudders mounted at diverging angles and each provided with means for raising and lowering the same.

In testimony whereof we have signed our names to this specification in the presence of two subscribing witnesses.

WELLINGTON RANDALL.
JOHN RANDALL.

Witnesses:
MARY E. SAUNDERS,
CHAS. L. BEAMAN.